2 Sheets—Sheet 1.
HARIG & STOY.
Lock.
No. 275.
Reissued Aug. 22, 1854.
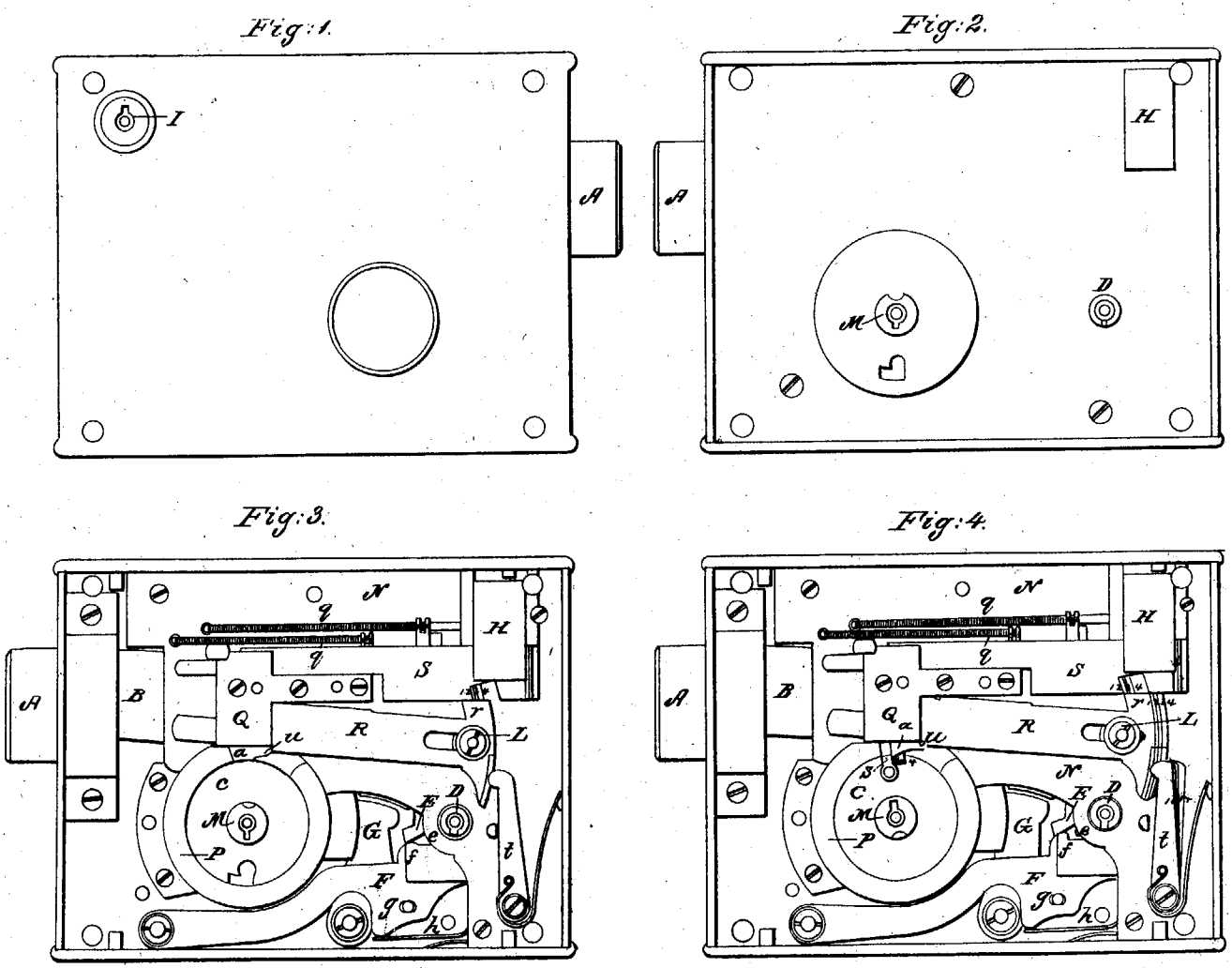
N. PETERS, Photo-Lithographer, Washington, D. C.

2 Sheets—Sheet 2.
HARIG & STOY.
Lock.
No. 275. Reissued Aug. 22, 1854.
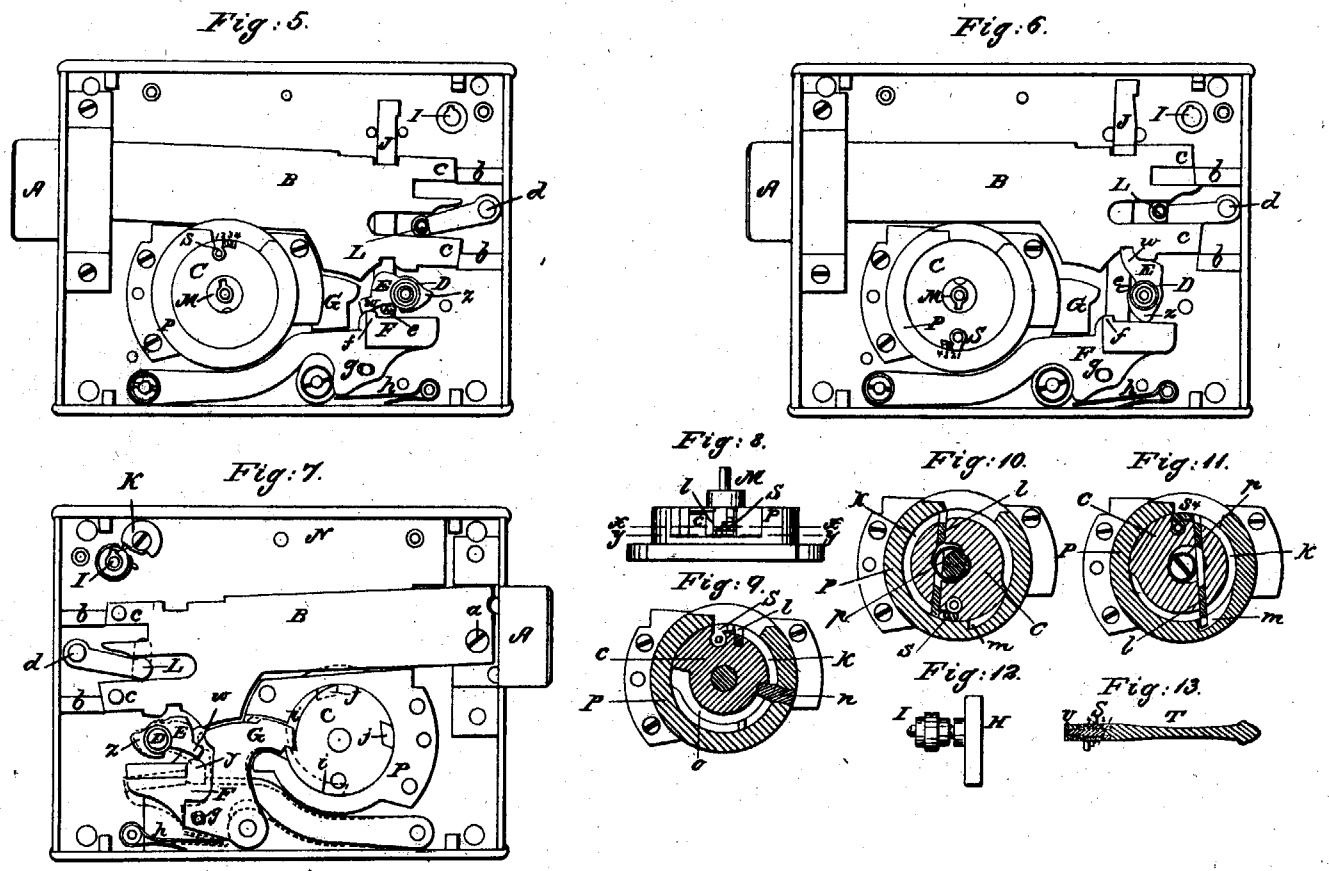
N. PETERS. Photo-Lithographer, Washington, D. C.

UNITED STATES PATENT OFFICE.

A. C. HARIG AND D. C. STOY, OF LOUISVILLE, KENTUCKY.

IMPROVEMENT IN BANK-LOCKS.

Specification forming part of Letters Patent No. 11,374, dated July 25, 1851; Reissue No. 275, dated August 22, 1854.

*To all whom it may concern:*

Be it known that we, AUGUSTUS C. HARIG and DAVID C. STOY, of Louisville, in the county of Jefferson and State of Kentucky, have invented a new and Improved Lock; and we do hereby declare that the following is a full and exact description thereof, reference being had to the accompanying drawings, making a part of this specification.

Figure 1 is a side view of our improved lock; Fig. 2, an opposite side view thereof; Fig. 3, a plan of the interior arrangement of the lock when it is locked and the key is withdrawn; Fig. 4, a similar view after the key has been inserted and has operated the tumblers previous to lifting and shooting the bolt; Fig. 5, a similar view of the lock in the same position as in Fig. 4, the tumblers and parts of the lock immediately connected therewith being removed to show the arrangement of the bolt and its dependent parts more distinctly; Fig. 6, a corresponding view showing the position of the movements of the lock after the bolt has been raised or vibrated preparatory to shooting it; Fig. 7, an opposite interior view of the lock in the position represented in Fig. 3; Fig. 8, a side view of the "usher" and key detached, in the same position as shown in Fig. 4; Fig. 9, a section of the same in the line *x x* of Fig. 8; Fig. 10, a section of the same in the line *y y* of Fig. 8, but in the position represented in Fig. 6; Fig. 11, a section thereof in the line *y y*, and in the position of Fig. 8; Fig. 12, a detached view of the clamp for confining the fixed tumblers; Fig. 13, a longitudinal section of the key.

Like letters designate corresponding parts in all the figures.

The first feature of our invention consists in connecting a series of male tumblers, R, &c., with a vibrating portion, B, of the bolt in such a manner that all of said tumblers must vibrate with said portion of the bolt, and said portion of the bolt must vibrate with said series of tumblers, while any one of the tumblers may be moved endwise independently of said vibratory portion of the bolt, and vice versa, to enable them to be operated in connection with a series of entirely independent stationary female tumblers, or their equivalents, substantially as hereinafter set forth.

The second feature of our invention consists in the employment of a series of female tumblers, *s*, &c., secured to the lock-case in such a manner that, while they admit of unlimited adjustment to suit the different positions into which modifications of the key may throw the male tumblers, they are so arranged as to be perfectly independent of the longitudinal movements of the series of male tumblers or the bolt, and consequently cannot be injured or disarranged by said movements, nor from any violence that may be exerted upon the head of the bolt, in connection with the said series of male tumblers R, &c., and the vibrating portion B of the bolt, arranged and combined in such a manner that they must vibrate with each other, and can be moved lengthwise independently of each other.

The third feature of our invention consists in the employment of fixed and strongly-secured studs *b b*, arranged in such positions that the bolt connot be shot back until the vibrating portion thereof is brought up to the highest point allowed by the matching of the series of male tumblers, with which it is combined, with the series of female tumblers that are combined with the lock-case, by which, when the bolt is shot out, both series of tumblers are perfectly protected from injury by any violence which may be exerted upon the bolt.

The fourth feature of our invention consists of a self-adjusting guard, *l*, arranged and operating in the "usher" C in such a manner that the introduction of powder or picking-instruments into the lock through the key-hole is effectually prevented.

The fifth feature of our invention consists in the arrangement of the inclined notch *i* on the usher C, with the dog G and the bolt-moving cam E, in such a manner that the act of turning the usher to enable the key which it carries to operate the tumblers will throw the dog G into such a position as to render it impossible for the said cam E to be brought in contact with the vibrating portion of the bolt during the movement of said usher, by which the possibility of "feeling" the positions of the tumblers while the key or other substituted instrument is in moving contact with them is entirely prevented. The bolt is jointed at *a* in order to allow the heel portion B thereof to vibrate transversely a certain distance, while its head A has only a longitudinal motion; but the pivot *a* serves, principally, to determine the center of vibration and keep the heel-piece in position, since any force which might be applied against the end of the bolt is sustained by the end of said heel-piece abutting against a shoulder in the head A of the bolt, as shown in Fig. 7. The joint is not absolutely necessary, but preferable to the alternative of giving a vibratory motion, however slight, to the head of the bolt. At the rear end of the bolt are situated two studs or projections, *b b*, in the positions represented, firmly secured to or forming a part of the case of the lock. The heel-piece or vibrating portion of the bolt is provided with notches which receive the studs when the bolt is in a horizontal position, and thus allow the bolt to be shot back; but when locking, the end of the portion B of the bolt vibrates or slides down transversely, and causes the projections *c c* thereon to abut against said studs, which thereby securely prevent the bolt from being moved back by any force till the portion B is again permitted to be raised to a horizontal position by the tumblers in the manner presently to be described. The bolt is actuated by means of a cam, E, which vibrates with its pivot D. The pivot is turned by an ordinary door-knob, or by means of a key (or removable hand) to be inserted in a suitable aperture in its projecting end, as represented in the drawings. Said cam is substantially of the form shown in the drawings, and its projection *w* first strikes an inclined edge of the bolt, by which it lifts the bolt to the proper position to be shot back, as indicated in Fig. 6, then, entering a notch therein, shoots the bolt in either direction. The vibrating portion B of the bolt is again drawn down before the studs *b b*, after being shot out by means of a strip, J, Figs. 5 and 6, which, being provided with a projection, *e*, to be depressed by the cam E, and with a shoulder projecting over the upper edge of the bolt, is thereby enabled to accomplish its purpose. When the bolt is again raised in unlocking, its upper edge in turn lifts the shoulder of the strip as far as it is itself moved, the strip being raised a little farther, so as to entirely clear the bolt by the action of a shoulder on the cam E, against the under side of the projection *e*, as shown in Fig. 6. A pin, L, attached to an arm which vibrates on a pivot, *d*, between the studs *b b*, fits accurately into a longitudinal notch in the rear end of the vibrating portion of the bolt, so that it must vibrate therewith, but will not prevent the free play of the bolt lengthwise. Said pin L also passes through longitudinal slots in the sliding tumblers R R, &c., Figs. 3 and 4, made just wide enough to receive it; consequently, it compels said tumblers and the actuating portion of the bolt to vibrate inseparably together. These slots are of sufficient length to allow the necessary longitudinal motion of the tumblers apart from their vibratory motion. The tumblers are respectively furnished with projections *r* 1 2 3 4 at their vibratory ends, which fit nicely into corresponding notches in a series of adjustable plates, *s s*, &c., arranged by the side of said tumblers. These plates, for the purpose of distinction, we designate "female tumblers." When the vibrating portion B of the bolt is depressed after being shot out, the projections *r* 1 2 3 4 of the sliding tumblers are withdrawn from the notches 1 2 3 4 of the female tumblers, and immediately forced longitudinally away therefrom by means of spring-fingers *t* 1 2 3 4, as shown in Fig. 3; hence, before the bolt can be again raised into a horizontal position to enable it to be shot back, all the projections *r* 1 2 3 4 must be brought precisely opposite their corresponding notches in the female tumblers, so as to enter therein when the bolt and tumblers are raised, as shown in Fig. 4. This is done by means of a suitable key, S, acting against projections *a a*, &c., Figs. 3 and 4, on the sliding tumblers. Said tumblers are so arranged as to always vibrate on a certain center, *u*, near the projections *a a*, &c., in whatever position they may be, the edges thereof, which bear against the female tumblers, as well as the projections *r* 1 2 3 4 and their receiving-notches 1 2 3 4, being formed concentric therewith. Both sets of tumblers slide in a suitable frame, Q, which guides them in their motions, keeps them in place, and properly separated. The whole fixtures of the tumblers are attached to a plate, N, which is screwed to the lock-case above the bolt and its fixtures, as represented, a slot being made in said plate to enable the pin L to vibrate. The key S has a number of bits, 1 2 3 4, equal to the number of tumblers, against which they respectively act. These bits are placed upon a square shank and secured there by a cap, *v*, Fig. 13, screwed upon the end thereof. They are removable at pleasure for the purpose of changing their order of permutation, or for substituting other bits, of which the owner of the lock may provide himself with any number. A handle, T, is provided which is screwed into the key to withdraw the same from the lock, but must be detached therefrom when the key is to be used. The key is introduced into the lock by means of a solid disk or cylinder, C, (which we designate the "usher,") vibrating on its axis within an inclosing-case, P, inside of the lock. In one end of the said usher, near the edge opposite to the tumblers, a depression is made of suitable size and shape to receive the key, which is inserted therein through a keyhole in the case of the lock, as represented in Figs. 2 and 3. The key is then carried around to the tumblers and made to operate against their projections *a a* by turning the usher, with a knob attached thereto, or by means of a key (or removable handle) inserted into a suitable depression, M, in the usher, in the same manner as that described for operating the cam E. The usher is returned to its original position in order to bring back the key to the key-hole by the action of a coiled spring, *p*, Figs. 10 and 11, which has one end secured to the usher and the other end to the fixed pivot thereof. The extent of vibration given to the usher is limited in both directions by means of a pin, *n*, passing through the case P and projecting thence into a groove, *o*, of the proper length in the periphery of said usher, as shown in Fig. 9.

It is obvious that as the key-cavity in the usher is immediately carried from under the key-hole in the case when moved toward the tumblers, and no space intervenes between the case and the solid parts of the usher, it is impossible for a wire or any other instrument to reach the tumblers through the key-hole. This feature alone we do not claim as new; but no lock heretofore constructed (so far as we are aware) with an usher or its equivalent has any provision against the introduction of a suitably-curved instrument, or of powder, through the key-hole into the key-cavity, and thence into the lock through the curved groove *k*, which extends around in the periphery of the usher from said key-cavity to the tumblers, and which is rendered necessary for the reception of the projections *a a* of said tumblers. To prevent the possibility of thus obtaining access to the interior of the lock, we employ the following device: A steel plate or bar, *l*, Figs. 10 and 11, wide enough to close the groove *k*, is fitted into a transverse aperture through the usher, so that it will freely slide lengthwise therein. Its length is just sufficient to reach across the usher, so that when the key-cavity is under the key-hole, as in Fig. 10, it will entirely close the groove *k*, thereby cutting off all communication between said cavity and the interior of the lock; but as the usher turns and the key approaches the tumblers, said plate or bar sinks by its own weight into an inclined cavity, *m*, in the case P, thus withdrawing its upper end from the groove *k*, and consequently allowing the tumblers free play therein, as shown in Fig. 11. By this means no instrument can enter beyond the key-cavity, and no more powder can be introduced therein than said cavity will itself contain; consequently no harm can be done in that way. As soon as the key has acted on the tumblers so as to bring their projections *r* 1 2 3 4 to the precise position for entering the notches of the female tumblers, it is held there until the bolt is raised into the position to be shot back by means of a dog, G, which is forced by a spring, *h*, into a notch, *j*, Fig. 7, in the usher, brought opposite to receive it at the proper moment. The dog is again withdrawn from said notch to allow the usher to return to its former position by the action of the cam E at the moment of shooting the bolt. A projection, Z, on said cam is so arranged that at the proper time it will strike and depress a vibrating arm, F, (which is coupled to the dog G by a slot and pin, *g*,) sufficiently to withdraw said dog from the notch *j*, whereupon the spring *p* immediately forces back the usher, with its key, to the key-hole, as represented in Fig. 6. In this latter position a notch, *i*, Fig. 7, in the usher receives the dog, which is raised therefrom by the action of the inclined or eccentric side of said notch from the motion of the usher itself. The usher can also at any time be set free from the dog by turning the cam E in the other direction, so that its projection *w* will bear upon and depress the projection *f* of the arm F, when the same result follows as when the arm F is acted upon by the projection Z of said cam E, as shown in Fig. 7 by red lines.

The usual method of picking tumbler-locks resorted to by expert "pick-locks" is by introducing some instrument through the key-hole, so as to move the tumblers one by one, and at the same time trying the bolt, in order to "feel" when each tumbler in turn is in the right position to allow the bolt to pass, (which a nice sense of touch would generally enable them to do, even with the utmost accuracy of construction.) Then, having noted those positions of the tumblers, a key is made to fit them and the lock is opened. In our lock, even if it were possible to reach the tumblers by any instrument, (which we have shown to be impracticable,) we have the following device to prevent the operation of feeding above mentioned, to wit: A projection on the dog G is so arranged that when the dog is pushed back by the usher C in the act of conveying the key to and of operating the tumblers, it will be brought over the projection *w* of the cam E, as shown in red lines in Fig. 7, so as to intercept the passage of the cam to the bolt. Thus it becomes impossible to bring said cam into contact with the bolt to effect the process of feeling till the key, or any instrument substituted in its place, has moved each tumbler as far as it is capable and the dog recedes into the notch *j*; but the great feature of security in our lock lies in its self adaptation to any key within the proper limit of size. This feature is produced by making the female tumblers above described adjustable to the key to be used in the following manner: Said tumblers are held in any desired position by means of a clamp, H, which is controlled by inserting a key into and turning a nut, I, Figs. 1, 7, and 12, that fits upon the screw-shank of said clamp. The arrangement is shown detached in Fig. 12.

Whenever it is required to adapt the lock to a different key, the clamp H is loosened and all the female tumblers are immediately drawn back to the same position by springs *q q*, &c., Figs. 3 and 4, in which positions their notches will admit the projections of the sliding tumblers when set free, as shown in Fig. 3. The two sets of tumblers are then united by raising the portion B of the bolt with the cam E, as in the act of unlocking. Then the desired key is put into the lock and brought to act upon the coupled tumblers, which necessarily brings the female tumblers into exactly the right positions for their notches to admit the projections on the sliding tumblers whenever operated by that key. They are therefore immovably secured in those positions by binding the clamp. The owner may consequently provide himself with an unlimited number of key-bits, and thus by using different bits and permutations thereof may change the key as often as he chooses, the lock by the above device being in a few seconds adapted to any change of key. Even by filing off one of the bits very slightly the key will become a different one, and will not open the lock until adapted to it. At the same time we secure all the advantages to be gained by the ordinary permutations of tumblers. Four tumblers are represented in the drawings; but any number may be employed, according to circumstances or the desire of the purchaser.

Having thus fully described our improved lock, what we claim therein as our invention, and desire to secure by Letters Patent, is—

1. Connecting the series of male tumblers R, &c., with the vibrating portion B of the bolt in such a manner that all of said tumblers must vibrate with said portion of the bolt, and said portion of the bolt must vibrate with said series of tumblers, while any one of said tumblers may be moved endwise independently of said vibrating portion of the bolt, and vice versa, by which they are enabled to be operated in connection with a series of entirely independent stationary female tumblers that can be adjusted in different positions, substantially as herein set forth.

2. The series of female tumblers *s*, &c., when they are secured in such a manner to the lock-case that, while they admit of unlimited adjustment to suit the different positions into which any key can be made to throw the series of male tumblers R, &c., they are so arranged as to be independent of the longitudinal movements of said male tumblers or the bolt which is combined with them, and consequently are perfectly protected from injury or disarrangement by said movements, and also from any violence that may be exerted upon the bolt.

3. In connection with the said series of male tumblers R, &c., and the vibrating portion B of the bolt, arranged and combined in such a manner that they must vibrate with each other, and can be moved lengthwise independently of each other, the fixed and strongly-secured studs *b b*, arranged in such positions that the bolt cannot be shot back until the vibrating portion thereof is brought up to the highest point allowed by the matching of the series of male tumblers, with which it is combined, with the series of female tumblers, that are combined with the lock-case, by which, when the bolt is shot out, both series of tumblers are perfectly protected from injury by any violence exerted upon the bolt, substantially as herein set forth.

4. The self-adjusting guard *l*, arranged and operating in the usher C in such a manner that the introduction of powder or picking-instruments into the lock through the keyhole is effectually prevented, substantially as herein set forth.

5. The within-described arrangement of the inclined notch *i* on the usher C with the dog G and the bolt-moving cam E, by which the act of turning the usher to enable the key which it carries to operate the tumblers will throw the dog G into such a position as to prevent the said cam E from being brought in contact with the vibrating portion of the bolt during the time said usher is being moved, by which the possibility of laterally feeling the positions of the tumblers while the key (or a substitute therefor) is in moving contact with them is entirely prevented, substantially as herein set forth.

The above specification of our improved lock signed and witnessed this 25th day of July, 1854.

AUGUSTUS C. HARIG.
DAVID C. STOY.

Witnesses:
O. C. GREEN,
ROBT. HENRY.